Nov. 1, 1966     E. C. ELSNER     3,282,229
ANCHOR FITTING
Filed Oct. 27, 1964
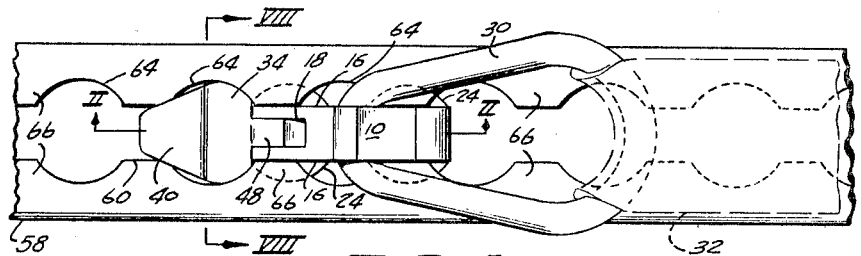
FIG. 1
FIG. 3
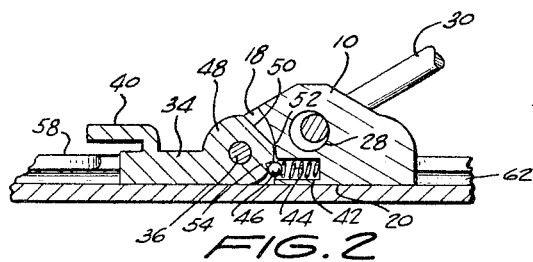
FIG. 2
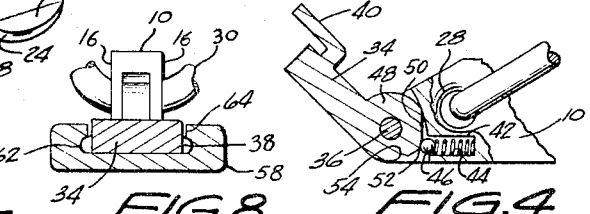
FIG. 5     FIG. 8     FIG. 4
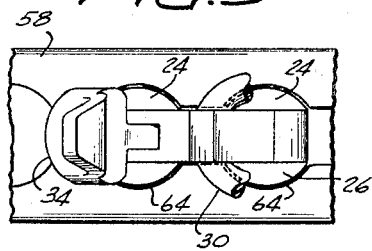
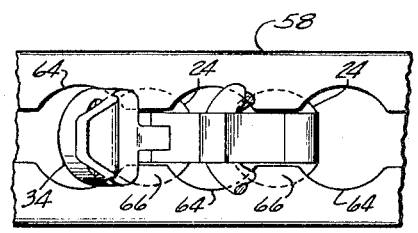
FIG. 6
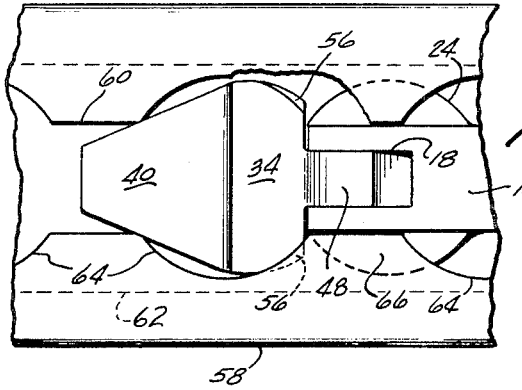
FIG. 7
INVENTOR
EDWIN C. ELSNER
BY Jerry K Harness
ATTORNEY United States Patent Office
3,282,229
Patented Nov. 1, 1966

3,282,229
ANCHOR FITTING
Edwin C. Elsner, Pasadena, Calif., assignor to
Aeroquip Corporation, Jackson, Mich.
Filed Oct. 27, 1964, Ser. No. 406,837
6 Claims. (Cl. 105—369)

The invention pertains to an anchor fitting, and particularly relates to the type of anchor fitting which may be employed with fixed track type attachments such as used to secure cargo in aircraft, vans, boat holds and the like.

Anchor fittings employed to secure cargo wherein a flexible strap or cord is attached to the fitting should be lightweight, easy to operate, readily manufacturable, dependable in operation and must be capable of withstanding relatively large loading forces, without damage, which may be imposed upon the fitting from a variety of directions. The track attachment means with which this type of anchor fitting is employed includes an undercut slot and a plurality of evenly spaced openings whereby enlargement defined upon the anchor fitting may be received within the slot through the openings. Retaining means are defined on the fitting to selectively lock the fitting relative to the track and a ring or similar device is used to permit the cargo hold-down strap to be attached to the fitting.

Anchor fittings of the above described type which are currently available usually employ spring biased retaining means for holding the fitting in the desired position relative to the track. The biasing force produced by the spring is used to insure engagement of the retaining means with the track. However, the use of the biasing force complicates the operations necessary to attach and remove the anchor fitting to and from the track and interferes with adjusting the fitting relative to the track after the enlarged fitting portions are received within the track slot. Also, another significant disadvantage of available anchor fittings lies in the fact that the load attachment means defined on the fitting to which the forces are applied are spaced from the track such a distance as to permit the fitting to bend and distort under heavy loads. Such distortions often irreparably damage the fitting and interfere with the proper operation thereof.

It is an object of the invention to provide an anchor fitting of the cargo tiedown type which is of a simplified construction, and which is capable of withstanding heavy loading forces without distortion or damage regardless of the direction of application of such forces upon the fitting.

Another object of the invention is to provide an anchor fitting to be used with track type attachment means wherein asembly and adjustment of the fitting upon the track is easily accomplished, and retention of the fitting upon the track is made in a positive manner without employing spring biased retainer means.

An additional object of the invention is to provide an anchor fitting adapted to be employed with a track type attachment means wherein the forces imposed upon the anchor fitting are applied to the fitting adjacent the track, thereby minimizing bending and torque forces within the fitting body permitting a high capacity anchor fitting to be constructed from a minimum of material.

A further object of the invention is to provide an anchor fitting of the cargo tiedown type which is used in conjunction with a track wherein retaining means defined upon the fitting are pivoted thereto and the retaining means include locking structure adapted to cooperate with the track and prevent accidental unlocking of the retaining means.

These and other objects of the invention arising from the details and relationships of the components of an embodiment thereof will be apparent from the following description and accompanying drawings wherein:

FIG. 1 is a plan view of an assembled anchor fitting and track in accord with the invention illustrating the cargo tiedown strap in broken lines, FIG. 2 is an enlarged, elevational, sectional view of the anchor fitting and track as taken along section II—II of FIG. 1, the retaining means being in the operative position, FIG. 3 is a perspective view of the anchor fitting illustrating the retaining means in the inoperative position, FIG. 4 is an elevational, partly sectioned, detail view of an end portion of the anchor fitting illustrating the retaining means in the inoperative position, FIG. 5 is a plan view of the anchor fitting and track upon the fitting being initially placed in the track with the retaining means in the inoperative position and the strap ring broken away for purposes of illustration, FIG. 6 is a plan view similar to FIG. 5 illustrating the relationship of the anchor fitting and track after the fitting has been shifted to the operative position relative to the track and prior to pivoting the retaining means into a track opening, FIG. 7 is an enlarged, detail, plan view of the anchor fitting and retainer therefor, illustrating the cooperation between the retainer locking means and the track, a portion of the track being broken away for purposes of illustration, and FIG. 8 is an elevational, sectional view taken along line VIII—VIII of FIG. 1.

The relationship of the components of an anchor fitting constructed in accord with the invention will be best appreciated from FIGS. 2 through 4. The anchor fitting includes a body 10 having end portions 12 and 14. The body is formed with a given width defined by the side walls 16, and a slot 18 is defined in the body end portion 12 intersecting the body bottom surface 20 as will be apparent from FIGS. 2 and 4. Holes 22 are formed in the body end portion 12, intersecting the slot 18, for receiving a retainer pivot pin as will be later described.

The lower portion of the anchor fitting body 10 is provided with a pair of enlargements hereafter referred to as pads 24. The pads 24 are of a width greater than the width of the body and are symmetrically related thereto, as will be apparent from FIGS. 1, 5, 6 and 7. The pads 24 include an upper shoulder 26 transversely disposed to the body side walls 16, and the pads are spaced relative to each other along the length of the body. The bottom of the pads is coplanar with the body bottom surface 20. A hole 28 is transversely defined through which a ring 30 may be passed. The conventional cargo tiedown strap or webbing 32, FIG. 1, is attached to the ring 30.

A retainer 34 is pivotally mounted upon the body end 12 by a pivot pin 36 received within holes 22. The retainer 34 includes a portion 38 having a configuration similar to the configuration of the pads 24 and track openings, and a handle portion 40 is affixed thereto for facilitating manual operation of the retainer. A recess 42 is defined in the fitting body 10 intersecting the slot 18 and contains a compression spring 44 and a ball detent 46. The retainer portion 48 received within the slot 18 is provided with a flattened surface 50, an edge 52 and a depression 54. The ball 46 is adapted to be received within the depression 54 upon the retainer 34 being pivoted to the operative position shown in FIGS. 1, 2 and 7. Upon pivoting the retainer to the raised inoperative position shown in FIGS. 3 through 6, the ball 46 bears upon the flat surface 50, as apparent from FIG. 4, and, thus, maintains the retainer in the elevated inoperative position. The edge 52 defines the edge of surface 50 and helps produce a "snap" action when moving the retainer between operative and inoperative positions.

The retainer 34 includes locking surfaces 56 defined thereon adjacent the fitting end portion 12. The locking surfaces 56 consist of shoulders facing the direction of movement of the retainer when being pivoted from the operative position to the inoperative position and these surfaces cooperate with the track in a manner which will be later described.

The anchor fitting of the invention is intended to be employed with a track type fixed attachment shown in FIG. 1. This type of track is well-known and shown in the United States Patents 2,688,504 and 2,743,684. The track 58 may be formed by an extrusion process and includes a slot 60 having a width slightly greater than the width of the body 10 defined by the side walls 16. The slot 60 is undercut at 62, FIGS. 2 and 8, and the slot undercut portion has a width which is slightly greater than the width of the pads 24. A plurality of evenly spaced openings 64 are defined in the track symmetrically intersecting the slot 60 and communicating with the slot undercut portion 62. The spacing between the openings 64 is such as to produce track flange portions 66 intermediate the openings.

The spacing between the anchor fitting pads 24 preferably corresponds to the spacing between adjacent track openings 64, and the pads 24 are preferably of a configuration corresponding to the track openings. Of course, the spacing between the pads 24 may be of a distance corresponding to a multiple of the distance separating adjacent track openings, and it is not necessary that the pads have a configuration corresponding to the openings. It is only necessary that the pads 24 be of a width greater than the slot 60 and less than the undercut portion 62, and are receivable within the openings 64.

The retainer portion 38 is of a configuration substantially corresponding to that of the openings 64, and is adapted to be received within a track opening upon the fitting being properly positioned relative to the track.

To assembly the anchor fitting to the track, the retainer 34 is pivoted to the inoperative position shown in FIGS. 3 and 4 and the pads 24 are aligned with the track openings 64, as shown in FIG. 5. The pads 24, being receivable within the openings 64, permit the bottom surface 20 of the fitting to engage the bottom of the slot undercut portion, and as the width of the pads is slightly less than the slot undercut portion width and as the height of the pads is less than the height of the slot undercut portion, the fitting may be freely axially positioned within the track slot, as desired.

Upon the anchor fitting being positioned relatively to the track as desired, the pads 24 are located below track flanges 66, as shown in FIG. 6. With this positioning of the anchor fitting, the retainer 34 may be pivoted toward the track and the spacing between the retainer 34 and the adjacent pad 24 is such as to permit the retainer to be received within the track opening 64 disposed therebelow. The configuration of the retainer is such as to rather closely fit the associated track opening, as will be appreciated from FIG. 8. The detent 46 is received within the depression 54 upon the retainer 34 being fully located within the opening 64 to the operative position shown in FIGS. 1 and 2. Further axial sliding of the fitting to the track is now prevented due to the cooperation between the retainer and the associated track opening.

Upon the retainer being pivoted to the operative position, the fitting is restrained against axial movement in the track slot solely by the retainer. Transverse forces imposed upon the fitting, through the ring 30, are resisted by the flanges 66 cooperating with the pads 24. As the ring hole 28 is located adjacent the track 58 and the slot 60, torque forces created within the fitting body, even when the force is transverse to the longitudinal direction of the track, are minimized, and bending or deformation of the fitting body will be prevented.

To assure retention of the retainer within the associated track opening 64 when the forces applied to the fitting are to the right in the axial direction of the track, FIG. 1, the configuration of the retainer is such and the locking surfaces 56 are so located that upon the anchor fiting being pulled to the right the locking surfaces 56 will be positioned under the track flange 66 adjacent the fitting end portion 12, as shown in FIG. 7. This interference between the retainer locking surfaces 56 and the track flanges 66 positively prevents pivoting of the retainer toward the inoperative position.

To remove the anchor fitting from the track it is merely necessary to position the anchor fitting body such that the locking surfaces 56 do not interfere with the track flange and pivot the retainer to the inoperative position shown in FIG. 4. The anchor fitting body is then moved within the track slot to the position shown in FIG. 5 wherein the pads 24 are aligned with track openings 64. The fitting is then lifted from the track slot.

It will be appreciated that the aforementioned objects of the invention are filled in the above-described anchor fitting. The body 10 and pads 24 may be cast as a homogeneous unit, and the retainer 34 may also be of a cast construction. Thus, the manufacture of the anchor fitting is simplified over known fittings of this type and, yet, a high strength fitting capable of being employed with heavy loading forces is provided.

It is appreciated that various modifications to the described embodiment may be apparent to those skilled in the art without departing from the spirit and scope of the invention, and it is intended that the invention be defined only by the scope of the following claims.

I claim:
1. An anchor fitting comprising, in combination,
 (a) a body having a given width and an end portion,
 (b) a slot defined in said end portion,
 (c) an enlarged pad defined on said body having a width greater than said given body width, an abutment shoulder defined on said pad,
 (d) load attachment means defined on said body adjacent said given width,
 (e) a retainer means having a portion received within said slot, and
 (f) a pivot pin bridging said slot pivotally mounting said retainer on said body for selective movement between operative and inoperative positions.
2. An anchor fitting comprising, in combination,
 (a) a body having a given width and an end portion,
 (b) a slot defined in said end portion,
 (c) an enlarged pad defined on said body having a width greater than said given body width, an abutment shoulder defined on said pad,
 (d) load attachment means defined on said body adjacent said given width,
 (e) a retainer means having a portion received within said slot,
 (f) a pivot pin bridging said slot pivotally mounting said retainer on said body for selective movement between operative and inoperative positions, and
 (g) retainer holding means mounted on said body selectively maintaining said retainer in said operative and inoperative positions.
3. An anchor fitting adapted to be employed with a fixed attachment including a slot having an undercut portion, evenly spaced enlarged openings being defined in the slot, comprising, in combination,
 (a) a body having a width portion slightly less than the width of the fixed attachment slot,
 (b) an enlarged pad defined on said body adjacent said body width portion, said pad being of a width greater than said body width portion and slot and slightly less than the width of the slot undercut portion, said pad having a height slightly less than the height of the slot undercut portion whereby said pad may be slidably received within the slot undercut portion, said pad being receivable into said slot through a slot opening.

(c) load attachment means defined on said body adjacent said width portion, (d) retainer means pivotally mounted on said body selectively movable between operative and inoperative positions, said retainer means being of a configuration substantially corresponding to the configuration of a slot opening and adapted to be received in a slot opening upon being moved to the operative position when said pad is located within the slot undercut portion and axially interposed between slot openings, and (e) detent means mounted in said body selectively maintaining said retainer means in said operative and inoperative positions.

4. An anchor fitting adapted to be employed with a fixed attachment including a slot having an undercut portion, evenly spaced enlarged openings being defined in the slot comprising, in combination, (a) an elongated body having a width portion slightly less than the width of the attachment slot, said body including an end, (b) a pair of enlarged spaced pads defined on said body adjacent said body width portion, said pads being of a width greater than the fixed attachment slot and slidably receivable within the slot undercut portion, said pads being receivable into said slot through the openings defined therein and spaced apart a distance comprising a multiple of the distance separating adjacent openings, (c) load attachment means defined on said body adjacent said body width portion, and (d) retainer means pivotally mounted on said body adjacent said end thereof, said retainer means being pivotable between operative and inoperative positions and of a configuration substantially corresponding to a slot opening, said retainer means adapted to be received within a slot opening upon being pivoted to the operative position when said pads are located within the slot undercut portion and interposed between slot openings.

5. In an anchor fitting as in claim 4:

(a) detent means mounted in said body selectively maintaining said retainer means in said operative and inoperative positions.

6. In an anchor fitting as in claim 4 wherein:

(a) a locking surface is defined on said retainer means, said locking surface being adapted to selectively engage the slot undercut portion upon said retainer means being moved to the operative position thereby preventing movement of the retainer means to the inoperative position.

References Cited by the Examiner
UNITED STATES PATENTS

| | | | |
|---|---|---|---|
| 2,422,693 | 6/1947 | McArthur | 105—369 |
| 2,743,684 | 5/1956 | Elsner | 105—369 |
| 3,140,850 | 7/1964 | Packard | 105—368 |
| 3,181,886 | 5/1965 | Blunden et al. | 280—179 |
| 3,187,686 | 6/1965 | De Podesta | 105—368 |
| 3,205,834 | 9/1965 | Terlecky | 105—368 |

ARTHUR L. LA POINT, *Primary Examiner.*

DRAYTON E. HOFFMAN, *Examiner.*